Feb. 24, 1925.
M. LINK
1,527,889
APPARATUS FOR MANUFACTURING ICE
Filed June 26, 1924
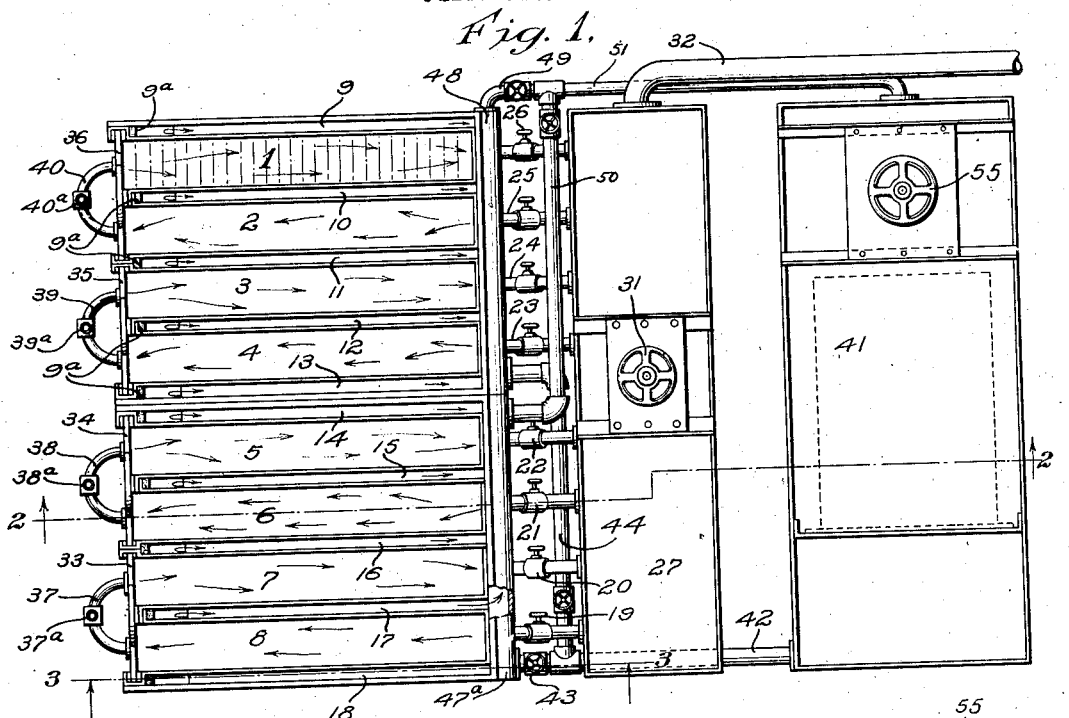
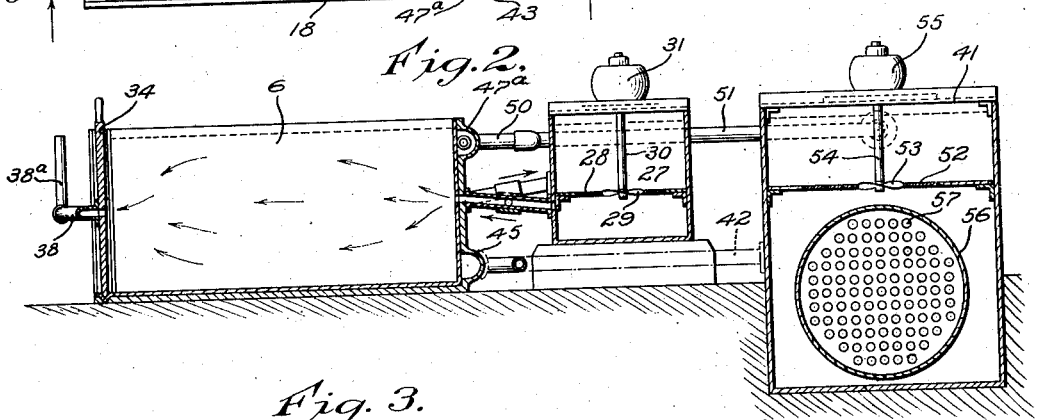
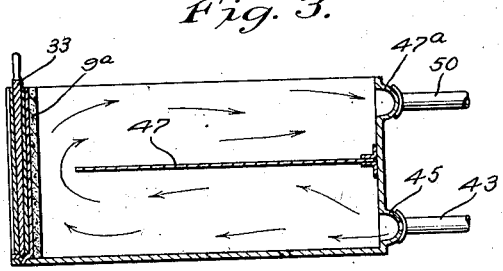
WITNESSES
INVENTOR
MARTIN LINK
BY
ATTORNEYS Patented Feb. 24, 1925.

1,527,889

UNITED STATES PATENT OFFICE.

MARTIN LINK, OF NEW BRUNSWICK, NEW JERSEY.

APPARATUS FOR MANUFACTURING ICE.

Application filed June 26, 1924. Serial No. 722,535.

*To all whom it may concern:*

Be it known that I, MARTIN LINK, a citizen of the United States, and a resident of New Brunswick, in the county of Middlesex and State of New Jersey, have invented a new and Improved Apparatus for Manufacturing Ice, of which the following is a full, clear, and exact description.

This invention relates to an apparatus for manufacturing ice. An object of the invention is to provide a simple and efficient apparatus whereby ice can be made in any desired quantity in single large cakes very readily, and by means of which apparatus the ice is exceedingly clear and can be handled to remove it from the apparatus with comparative ease.

Another object concerns the provision of means whereby the operation of the device is exceedingly simple, so that an ordinary workman can attend to apparatus capable of producing a very large number of cakes.

A further object concerns the provision of means whereby the production of the ice is continuous, to a large extent.

The invention is illustrated in the drawings, of which—

Figure 1 is a plan view of the apparatus;

Fig. 2 is a section taken on the line 2—2 of Fig. 1; and

Fig. 3 is a section taken on the line 3—3 of Fig. 1.

The form of the invention shown in the drawings is a preferred form, although it is understood that modifications in the construction and arrangement of the parts and in the character of the materials used may be adopted without departing from the spirit of the invention as set forth in the appended claims.

In its general aspect the invention contemplates the provision of a plurality of separate chambers in each of which a single cake of ice is to be formed. Through these chambers a continuous circulation of water is adapted to be produced by simple and efficient means. These chambers are to be effected by the flow of a refrigerant medium, such as brine, along their walls, especially at the sides thereof throughout their height. The refrigerant itself is circulated continuously throughout the system. One end of each chamber is provided with a removable gate, and by a simple process the gate can be removed so that the cake of ice within each chamber can be easily slipped out horizontally on to a platform. When the cakes are removed the gates can be replaced and the process continued.

More specifically, the invention comprises a plurality of separate chambers arranged in a unit or units, through a number of which in series the liquid to be frozen is circulated continuously. Preferably the chambers are arranged in pairs and the liquid circulates through one after the other. As this circulation continues, the brine or refrigerating medium is circulated along the side walls of the chambers, gradually freezing the water. It is found that continuous circulation will cause the water to freeze very rapidly and that the ice cakes so produced will be very clear. By having the gates removable the individual cakes can be slipped out on to a platform without the necessity of lifting them out of the chambers, whereby considerable labor and time can be saved in removing the cakes.

The preferred embodiment of the invention as illustrated in the drawings comprises a plurality of containers 1 to 8, inclusive, arranged, preferably, in units of four, side by side. Refrigerant chambers 9 to 18, inclusive, are formed on opposite sides of each ice chamber. The outer end of each chamber is provided with a layer 9ª of any suitable material, such as cork. The ice chambers are connected by pipes 19 to 26, inclusive; 19, 21, 23 and 25 extend from the lower portion of a tank 27 to the middle portion of the rear wall of the containers or tanks 2, 4, 6 and 8. Pipes 22, 24, and 26 are connected from the rear walls of the containers 1, 3, 5 and 7 to the upper portion of the tank 27. These pipes are provided with suitable valves so that they can be shut off independently if desired. Tank 27 is provided throughout its length with a partition 28, which is provided with an aperture intermediate its length in which a fan 29 is exposed, this fan being connected to a shaft 30 operated by a motor 31 mounted suitably on top of the tank 27. The tank is provided with an inlet pipe 32.

At the opposite ends of the tanks 1 to 8, they are in pairs provided with slidable gates 33, 34, 35 and 36. For instance, gate 33 closes the outer ends of the tanks 7 and 8; 34, the tanks 5 and 6; 35, the tanks 3 and 4; and 36, the tanks 1 and 2. These gates are provided with pipes 37, 38, 39 and 40 connecting the adjacent tanks in pairs. Each of these pipes 37 to 40, inclusive, are provided with vertical overflow pipes 37ª to 40ª, respectively, in order that the liquid within the ice tank can overflow therethrough when desired.

The water or other liquid to be frozen enters through the pipe 32 into the tank 27. The fan or propeller 29 is operated by the motor 31 to produce a circulation from the tank through the pipes 19, 23 and 25, through the respective tanks or containers fed by said pipes, through the pipes 37, 38, 39 and 40, back through the other containers of the series, such as 7, 5, 3 and 1, through said tanks or containers and out pipes 20, 22, 24 and 26 to the upper portion of the tank 27. In this manner a continuous circulation is achieved through the containers simultaneously. The water will leave the main tank, passing into the group of ice tanks or containers, and thence through other tanks and back to the system again. During this time the brine or other refrigerant medium has been passing from the brine tank 41, through pipe 42 into the pipes 43 and 44 connected to conduits 45 and 46. These conduits extend along the rear lower edges of the ice chambers and connect to the refrigerant chambers 9 to 18, inclusive. Each of these refrigerant chambers, such as shown in Fig. 3, is provided with a baffle plate or partition 47, so that the refrigerant has to pass along the bottom of the chambers, then around the partition and back along the upper portion of the chamber and out into another pair of conduits 47ª and 48 connected to the rear upper edge of the ice chambers. These conduits in turn are connected to discharge or outlet pipes 49 and 50 leading to a pipe 51 which extends back to the upper portion of the brine tank 41. This brine tank is provided with a partition 52 extending thereacross. In this partition a propeller 53 is located, mounted on a shaft 54 and driven by a motor 55 on top of the tank. The brine enters the tank through the pipe 51 at the top and then is forced by the propeller into the bottom portion, where it passes into association with a drum 56 within which a plurality of pipes 57 are disposed. The refrigerant passes around these pipes and is cooled, and thence passes out of the tank through the pipe 42 and through conduits 45 and 46 previously mentioned.

In this manner, it will be observed, the water to be frozen is circulated through all the ice tanks and the brine or other refrigerating liquid is also continuously circulated around the walls of the ice tank. After this apparatus is started into operation it is found that the water in the tanks will freeze very rapidly and clearly. When they are frozen into a plurality of single large cakes the circulation is stopped and the end gates of each pair of tanks are lifted out of place, whereupon the cakes can be slid out on to a platform and the gates replaced. The circulation can then be started again and the operation repeated. By providing the circulating refrigerating liquid the operation is speeded up. By providing the removable gates the ease of handling the large heavy cakes is considerably enhanced. It is an easy matter for an ordinary workman to slip a long cake of ice along a substantially horizontal surface, whereas for him to lift such a cake out of a container is a very laborious process and one in which the cake is liable to be broken. By this process large, clear, smooth cakes are rapidly formed; and it is found that the production and quality are very much increased and the cost of manufacture considerably reduced.

What I claim is:—

1. An ice making apparatus, comprising a plurality of containers, refrigerating chambers at the sides of the containers, pipes establishing communication between adjacent containers at one end, a water tank adjacent the containers and chambers, and having upper and lower communicating chambers, pipes connecting alternate containers with the upper and lower chambers of the tank, means for causing a circulation of the water from the tank through said pipes and containers, a tank containing a refrigerating liquid and having upper and lower communicating chambers, pipes connecting the lower chamber of the said tank with the lower portions of the refrigerating chambers, pipes leading from the upper parts of the refrigerating chambers to the upper chamber of the said tank, and means for causing a circulation of the refrigerating liquid through said pipes and refrigerating chambers.

2. A refrigerating apparatus, comprising a plurality of containers, refrigerating chambers at the sides of the containers, and each having a baffle projecting from the end thereof, pipes establishing communication between adjacent containers at one end, a water tank provided with an apertured horizontal partition forming upper and lower chambers, pipes connecting alternate containers with the upper and lower chambers of the tank, a propeller in the opening of the said partition for causing a circulation of the water through the containers, a brine tank having an apertured horizontal partition forming upper and lower chambers, a cooling device in the lower chamber of the brine tank, pipes connecting the lower chamber of the brine tank with the lower portions of the refrigerating chambers, pipes leading from the upper portions of the refrigerating chambers to the upper chamber of the brine tank, and a propeller in the opening in the aperture of the partition of the tank for causing a circulation of the brine.

3. An ice-making apparatus, which comprises an ice tank, a removable gate at one end thereof to permit the cake of ice to be slid out of the tank, a pipe carried by said gate connecting said tank to another tank, and an overflow pipe connected to said first-mentioned pipe.

4. An ice-making apparatus, which comprises a pair of ice tanks, a slidable gate disposed at one end of a pair of tanks, a pipe carried by each gate to permit the flow of water from one tank to the other, said pipe and gates being slidably removable from the tank to permit the cakes of ice formed therein to be slid out.

MARTIN LINK.